United States Patent
Lenihan

(10) Patent No.: US 11,408,558 B2
(45) Date of Patent: Aug. 9, 2022

(54) REVERSIBLE L-BRACKET

(71) Applicant: 3 LEGGED THING LIMITED, Bedfordshire (GB)

(72) Inventor: Danny Lenihan, Bedfordshire (GB)

(73) Assignee: 3 LEGGED THING LIMITED, Bedfordshire (GB)

(*) Notice: Subject to any disclaimer, the term of this patent is extended or adjusted under 35 U.S.C. 154(b) by 0 days.

(21) Appl. No.: 17/278,401

(22) PCT Filed: Sep. 24, 2019

(86) PCT No.: PCT/GB2019/052677
§ 371 (c)(1),
(2) Date: Mar. 22, 2021

(87) PCT Pub. No.: WO2020/065289
PCT Pub. Date: Apr. 2, 2020

(65) Prior Publication Data
US 2021/0356076 A1 Nov. 18, 2021

(30) Foreign Application Priority Data
Sep. 25, 2018 (GB) .................................. 1815612

(51) Int. Cl.
*F16M 13/02* (2006.01)
*G03B 17/56* (2021.01)

(52) U.S. Cl.
CPC ......... *F16M 13/022* (2013.01); *G03B 17/561* (2013.01)

(58) Field of Classification Search
CPC combination set(s) only.
See application file for complete search history.

(56) References Cited

U.S. PATENT DOCUMENTS

| 4,081,814 A | 3/1978 | Bulland |
| 8,662,763 B2 * | 3/2014 | Vogt .................... F16M 13/022 |
| | | 396/428 |

(Continued)

FOREIGN PATENT DOCUMENTS

| CN | 204268003 | 4/2015 |
| CN | 206237490 U | 6/2017 |

(Continued)

OTHER PUBLICATIONS

Search Report dated Nov. 12, 2021 issued in corresponding GB Appln. No. 1815612.5.

(Continued)

*Primary Examiner* — Monica E Millner
(74) *Attorney, Agent, or Firm* — Andrus Intellectual Property Law, LLP

(57) ABSTRACT

There is provided a mounting assembly for mounting a device to a support, the assembly comprising: a base plate comprising a connector to removably connect, in use, the base plate to the device, and an engagement means for engagement with the support; and an arm being a plate having a C-shape provided by an aperture in the plate, the arm thereby having an opening in a side, the arm having a plurality of attachment elements arranged, in use, to attach the arm to the base plate, wherein the position of the opening causing the opening to have a different position relative to the base plate when the arm is connected to the base plate by each respective attachment element.

20 Claims, 5 Drawing Sheets

(56) References Cited

U.S. PATENT DOCUMENTS

| | | | |
|---|---|---|---|
| 9,052,574 B1* | 6/2015 | Johnson, Sr | F16M 11/105 |
| 9,280,039 B2 | 3/2016 | Johnson, Sr. et al. | |
| 9,298,069 B2* | 3/2016 | Johnson, Sr. | H01G 9/0036 |
| 9,372,383 B2* | 6/2016 | Johnson, Sr | G03B 17/56 |
| 10,437,138 B1* | 10/2019 | Fudala | G03B 17/561 |
| 2010/0158499 A1 | 6/2010 | Kendall | |
| 2015/0286116 A1 | 10/2015 | Johnson, Sr. et al. | |

FOREIGN PATENT DOCUMENTS

| | | |
|---|---|---|
| CN | 207539555 U | 6/2018 |
| JP | H03130744 | 10/1989 |
| KR | 20180001550 | 5/2018 |

OTHER PUBLICATIONS

Search Report dated Mar. 18, 2019 issued in corresponding GB Appln. No. 1815612.5.
International Search Report and Written Opinion in corresponding PCT/GB2019/052677, dated Apr. 2, 2020.
First Office Action for Chinese Patent Application No. 2019102845433, dated Mar. 9, 2022.

* cited by examiner

REVERSIBLE L-BRACKET

CROSS-REFERENCE TO RELATED APPLICATIONS

This application is the U.S. national stage application of International Application No. PCT/GB2019/052677, filed Sep. 24, 2019, which international application was published on Apr. 2, 2020, as International Publication No. WO/2020/065289 in the English language. The International Application claims priority of United Kingdom Patent Application No. 1815612.5, filed Sep. 25, 2018.

The present invention relates to a mounting assembly for mounting a device to a support.

Photographers and cinematographers commonly mount cameras and other photographic and cinematic devices on supports such as tripods and monopods. While such supports are typically provided with a swivel or joint element to allow the device to be configured between different orientations, such as landscape or portrait, moving between the orientations can be cumbersome and can often shift the centre of gravity of the device resulting in a loss of stability.

L-brackets, which allow an easy and controlled configuration of a photographic device between different orientations on the support, have become increasingly popular with consumers. They also retain the camera sensor position, which in turn retains the focal plane, which is the signature attribute of an L-Bracket. An L-bracket is a mounting assembly which consists of a base portion and an arm portion positioned at a right angle to the base portion to provide the "L" shape that gives the bracket its name. Each of the base portion and the arm portion typically has a means for connecting to a support, which typically includes a quick-release engagement means which is able to co-operate with a complementary engagement element on the support for easy attachment and detachment. The camera, or other photographic device, is securely mounted on the base portion of the L-bracket such that the arm portion extends parallel to a side of the device. Usually, a face of the arm portion also abuts the side of the device. The L-bracket can then be mounted on the support via either one of the base or arm portions. Using the quick-release engagement of the L-bracket, a user can easily switch between a first configuration in which the device is secured on the support at a first (e.g. landscape) orientation, and a second configuration in which the device is secured on the support at a second (e.g. portrait) orientation.

Due to the way in which an L-bracket cradles a device, in use, some portions of the mounted device can be obscured by various parts of the L-bracket. For example, the arm portion of the L-bracket can often obscure connection ports on the side of a mounted camera. Additionally, the base can obstruct the battery door or may impede the use of a flip-up or openable screen. While L-brackets can be designed to try and avoid blocking specific features on cameras, most cameras are significantly different in design. As such, L-brackets typically have to be designed specifically for each device, which results in a high cost and low availability for consumers. Furthermore, consumers who use more than one device typically have to carry around multiple L-brackets.

There is therefore a need for a mounting assembly with the capability to provide the above functionality, but which can be adapted for different devices.

The present invention seeks to address at least some of the above problems.

SUMMARY OF THE INVENTION

According to a first aspect there is provided a mounting assembly for mounting a device to a support, the assembly comprising a base plate comprising a connector to removably connect, in use, the base plate to the device, and an engagement means for engagement with the support; and an arm being a plate having a C-shape provided by an aperture in the plate, the arm thereby having an opening in a side, the arm having a plurality of attachment elements arranged, in use, to attach the arm to the base plate, wherein the position of the opening causing the opening to have a different position relative to the base plate when the arm is connected to the base plate by each respective attachment element.

By having an opening and a plurality of attachment elements arranged to attach the arm to the base plate, it is possible to provide a mounting assembly having an opening in the arm portion in which the position of the opening with respect to the base plate can be easily varied. The opening in the arm portion provides, in use, access to the device even when the device is fully mounted on the mounting assembly. By changing the position at which the arm is connected to the base plate, the user can easily configure the mounting assembly to suit the dimensions of the device to which it is applied. The first aspect thereby provides a versatile mounting assembly which can be adjusted for use with many different devices, while providing the functionality of a stable and reliable mounting to a support.

The base plate and arm may be orientated at a right angle relative to each other. Such a configuration allows the mounting assembly to function as an L-bracket, while providing the versatility of being adjustable for the device to which the mounting assembly is applied.

Whilst the arm may have attachment elements arranged in any position, typically the arm may have opposing ends, the opening being between the opposing ends, and each end may have at least one attachment element.

The distance between attachment elements at the ends of the arm and the relative location of the opening in relation to the ends allows a greater variation in the location at which the arm can be attached to the base plate. By allowing a greater variation in the connection between the arm and the base plate, it is possible to provide a wide range of positions to which the opening in the arm can be configured. The positioning of attachment elements at the ends of the arm also allows the attachment elements not to interfere with the main body of the arm, such that the aperture can be made as large as possible to provide increased access to the device in use.

Typically, the arm may have a front face and a rear face (in addition to the arm having sides for example). Additionally each face may have at least one attachment element. By each face of the arm having an attachment element, the versatility is improved by providing a greater number of positions in which the opening of the arm is able to be placed. Further the attachment elements may be in corresponding positions on each face. This makes it possible to ensure that the load experienced due to attachment with the base plate is consistent. Furthermore, if the attachment elements at similar or corresponding positions on each face, as is an option, significantly simplifies manufacture of the arm.

Each attachment element may comprise one or more bores. Furthermore, each of the bores may be arranged, in use, to engage a first securing element engageable with the base plate. Mounting equipment such as the mounting assembly of the first aspect is often used to mount delicate and often very expensive, devices to a support. It is important therefore that any connection between parts is rigid and stable. By having bores arranged to accept and engage a securing element, it is possible to ensure a tight connection between the arm and the base plate.

The first securing element may comprise a rail. At least a portion of the rail may have a threaded surface. To co-operate with the threaded surface of the rail, the bores may be threaded bores or have a threaded portion. A threaded connection, such as that provided by a screw, ensures tight and durable attachment of the first securing element to the attachment means.

Each of the bores may be through-bores. When the first securing element is longer than the bore, this allows the length of a projecting part of the first securing element to be adjusted and further allows the first securing element to be accessed and adjusted from either side of the connection. Of course, it would be possible for each bore to be a blind-bore or for there to be a combination of through-bores and blind-bores.

Each of the through-bores may be distinct and spaced apart from each other. However, to provide additional functionality, typically the through-bores of each attachment means may be joined by one or more slots extending between the through-bores. For example, the slots may be used to clip or attach additional components to the mounting assembly. In some examples, the slots may themselves be through-slots, extending between the front and rear faces of the arm. In such a case, the through-slots can provide a further functionality as a loop for a camera strap, for example. Another advantage of slots between the bores is that this reduces the weight of the mounting assembly.

The connector on the base plate may comprise any element suitable to accept and removably engage a device. Typically, the connector may comprise a connector bore, and the connector bore may be arranged, in use, to engage a second securing element. A connector bore can provide a secure and stable connection between the device and the base plate, allowing for co-operation with a second securing element. The use of a connector bore as a connector is also advantageous in that it allows a device with an in-built connector, for example, a clip or a push-fit element to be connected to the base plate. As with the bores of the attachment means, the connector bore may be a through-bore, and may be at least partially threaded. The second securing element may be a rail or a bolt, and at least a portion of the second securing element may be threaded. To provide further flexibility, the attachment means of the arm may also be arranged to engage, in use, with the second securing element.

The base plate may comprise one or more bores arranged, in use, to engage with a first securing element to secure the base plate to the attachment means of the arm. By having bores arranged to engage with the first securing element, it is possible to reliably secure the arm to the base plate through the first securing element. In addition to, as an alternative to, the bores, the base plate may further comprise grooves or recesses arranged to receive and/or guide the first securing element. The grooves or recesses may be separate from, or continuous with, the bores of the base plate.

The first securing element may be slideable relative to the base plate. A sliding arrangement allows the connection between the arm and the base plate to be easily and precisely adjusted. For example, such an arrangement allows a user to easily adjust the mounting assembly to suit the dimensions of different devices.

The first securing element may be held in position in the bores of the base plate by a locking member.

In order to ensure a sturdy connection between the base plate and the arm, the first securing element typically is held in position in the bores of the base plate.

The base plate may further comprise a locking member to lock the first securing element in position. The base plate may comprise one or more locking members, each arranged to lock one or more first securing elements in position. In the case that the first securing element is slideable relative to the base plate, once the user has adjusted and selected a configuration of the first securing element, the user may lock the base plate and arm in position by using the one or locking members.

It is important that the locking member is able to engage and maintain a secure hold of the first securing elements. Typically, the locking member may comprise one or more locking screws each arranged to engage one or more first securing elements. Alternatively, the locking member may comprise a clamp or a jaw arranged to grip the one or more first securing elements.

An important feature of the mounting assembly is the ability to mount the device to the support at two or more different orientations. To achieve this, the mounting assembly may be mounted to the support at either the base plate or the arm. The arm may comprise an engagement means for engagement with the support to achieve this.

The engagement means (ether on the arm or on the base plate) may be arranged to co-operate with a corresponding member on the support. For example, the engagement means may comprise one or more grooves arranged to cooperate with a jaw on the support. The engagement on one or both of the arm and the base plate may comprise a pair of grooves on opposing sides of the arm and base plate respectively. In a case where the mounting assembly is secured and gripped by a clamp or a jaw on the support, having a pair of grooves on opposing sides allows a strong and even application of force from the clamp or jaw. The grooves may be separate and attached to one or both of the base plate and the arm. Alternatively, the grooves may be integrally formed with one or both of the base plate and the arm.

The grooves of the engagement means may be dovetail grooves, meaning that at least a portion of the groove's cross section has a trapezoidal or triangular shape, and the groove is arranged to cooperate with a rail or jaw having a complementary shape to form a 'dovetail joint'. Dovetail joints provide a secure engagement, and have a high resistance to being pulled apart. This ensures improved stability. Furthermore, such an arrangement allows the engagement means of the base plate or arm to be easily slid in to a complementary member on the support, improving ergonomics. A further advantage of the use of dovetail grooves is that many support products use dovetail jaws to provide what is known as a 'Quick-Release (QR)' mechanism to facilitate rapid attachment and detachment of devices to the support. By using dovetail grooves, the mounting assembly provides compatibility with many supports, further improving versatility of the mounting assembly. For example, the engagement means may take the form of an Arca-Swiss style connection that is arrange in use to connect with a clamp or support with an Arca-Swiss style jaw arrangement.

The base plate may typically comprise an upper surface and a lower surface, the upper surface being arranged to receive, in use, the device to be mounted on the mounting assembly.

Many photographic devices have parts which have the ability to extend out of its main volume. For example, some modern cameras are provided with a 'flip' screen. Such a screen typically has the capability of being flipped and pulled to extend out of the camera. To accommodate for, and provide access to, parts of the device extending outward, at least one edge of the upper surface of the base plate may comprise a downward chamfer.

As it will be appreciated, many of the parts of the mounting assembly described above may be modular and removeable.

According to another aspect, there is provided a kit of parts for a mounting assembly according to any preceding claim, the kit comprising: a base plate comprising a connector to removably connect, in use, the base plate to a device, and an engagement means for engagement with a support; and an arm being a plate having a C-shape provided by an aperture in the plate, the arm thereby having an opening in a side, the arm having a plurality of attachment elements arranged, in use, to attach the arm to the base plate, wherein the position of the opening causes the opening to have a different position relative to the base plate when the arm is connected to the base plate by each respective attachment element.

BRIEF DESCRIPTION OF THE DRAWINGS

An example mounting assembly will now be described by way of example with reference to the accompanying drawings, in which.

DETAILED DESCRIPTION

Figure 1:
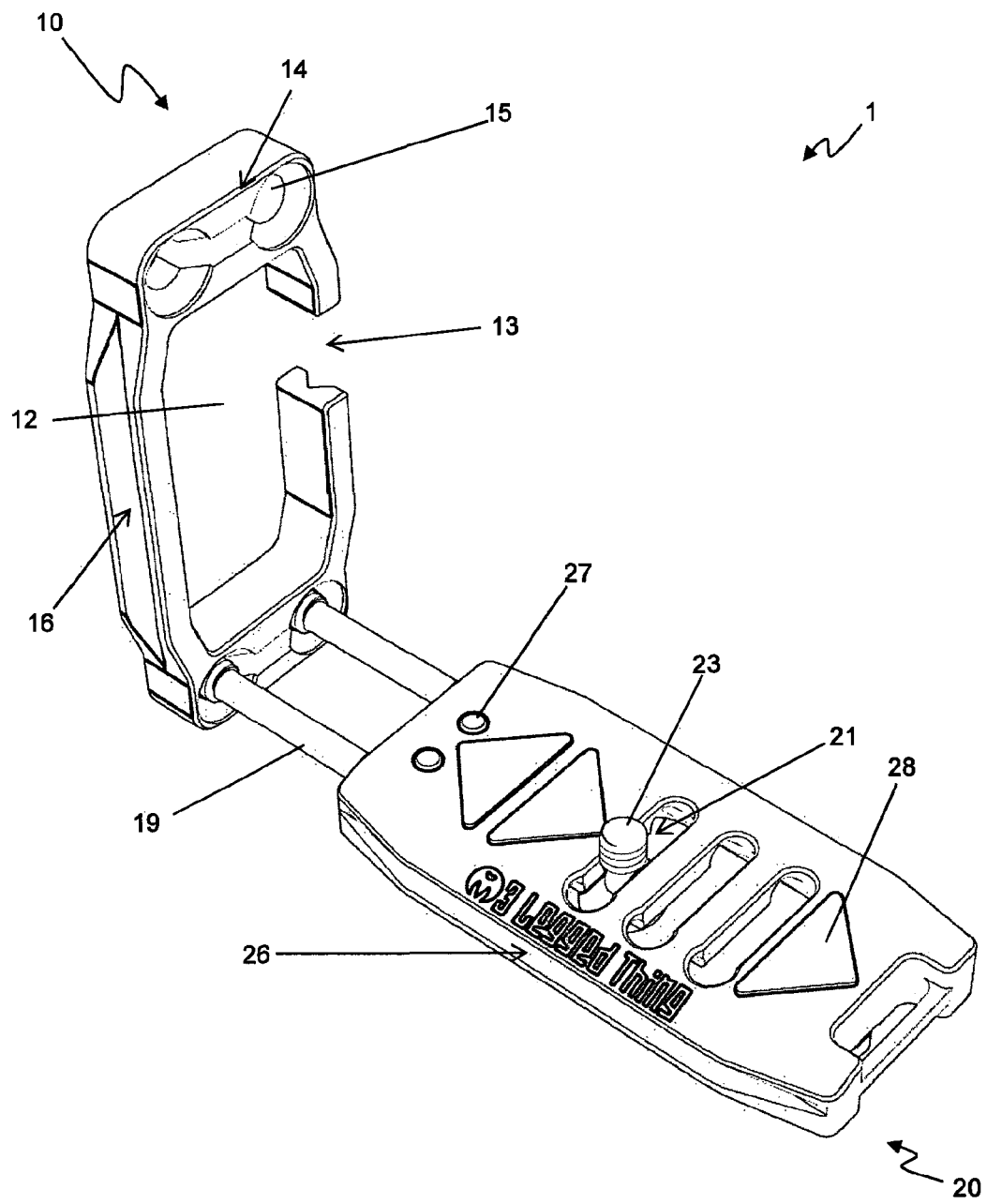
FIG. 1 schematically illustrates an example mounting assembly in an assembled configuration.

An example mounting assembly 1 is generally illustrated in an assembled configuration in FIG. 1. The mounting assembly 1 comprises an arm 10 and a base plate 20.

The mounting assembly 1 arranged to receive a device, such as a camera or other photographic or cinematic equipment, at either one of the arm 10 or the base plate 20.

The arm 10 comprises a plate 11 having an aperture 12 therethrough. The aperture 12 is provided on the arm 10 so as to form an opening 13 in a side, such that the arm 10 is substantially C-shaped. By C-shaped, we mean a shape having the shape of a capital letter 'C'. For example, such a shape takes the form of a quadrilateral having a break, or a gap, at one of its sides, as is shown in the configuration illustrated in FIG. 1. In other examples, a 'C-shape' may alternatively take the form of any other polygon or ellipse having a break or a gap on one of its sides.

In this example, the C-shaped arm 10 generally has two pairs of opposing sides: two opposing longitudinal sides, and two opposing lateral sides, the longitudinal sides being longer than the lateral sides. This forms a generally rectangular shape. The opening 13 is provided on one of the longitudinal sides, at a position closer to one of the two lateral sides than the other lateral side. In other examples, the opening 13 can be provided at a position which is equidistant from the pair of lateral sides. The opening 13 may also be provided at one of the lateral sides, rather than at a longitudinal side. In other examples, the lateral and longitudinal sides may have the same length thereby forming a generally square shape.

In addition to the two pairs of opposing sides, the arm 10 has two faces. These are separated by the sides of the arm, which provide the arm with its thickness.

Figure 2A:
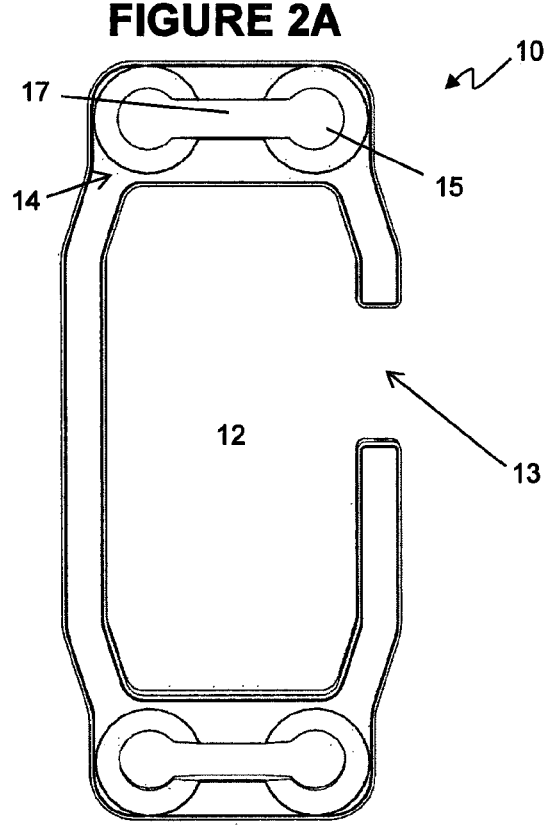
FIG. 2A schematically illustrates an example configuration of an arm of the mounting assembly of FIG. 1.
Figure 2B:
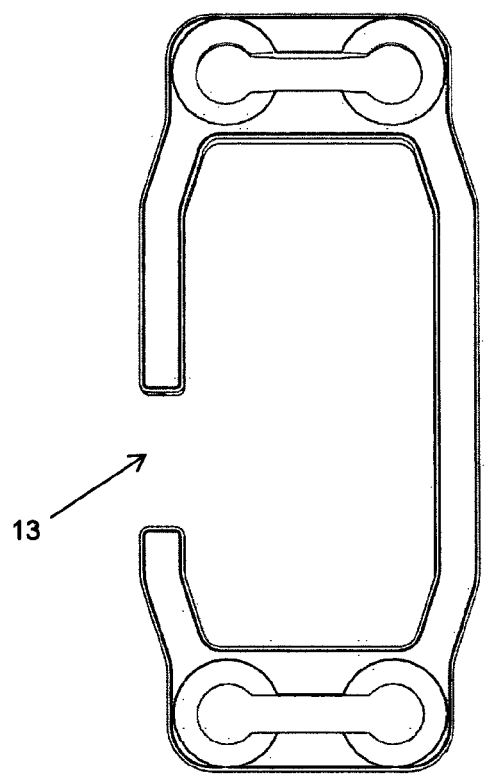
FIG. 2B schematically illustrates another example configuration of an arm of the mounting assembly of FIG. 1.
Figure 2C:
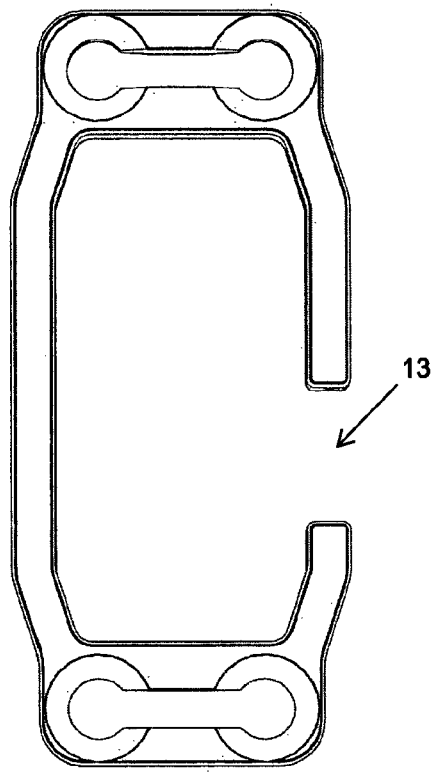
FIG. 2C schematically illustrates another example configuration of an arm of the mounting assembly of FIG. 1.
Figure 2D:
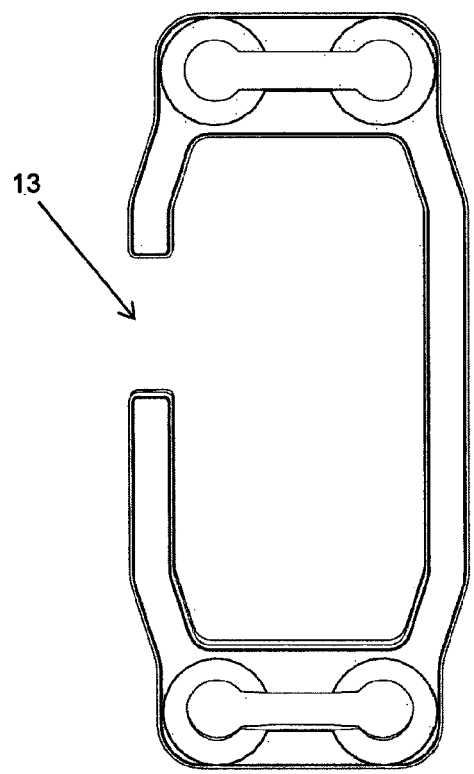
FIG. 2D schematically illustrates another example configuration of an arm of the mounting assembly of FIG. 1.

FIGS. 2A through 2D illustrate how the arm 10 can be configured to 'move' the position of the opening 13. FIG. 2A shows the arm 10 having the opening in a first position (in this example in an upper right quadrant of the arm). The arm 10 of FIG. 2A can be rotated through 180 degrees in the plane of the arm 10, as illustrated in FIG. 2B, to reposition the opening 13 apparently on an opposite longitudinal side to the arm 10 of FIG. 2A (so in this example in a lower left quadrant of the arm). Furthermore, the arm 10 of FIG. 2B can be rotated 180 about its longitudinal axis, to further reposition opening 13. Such a position is shown in FIG. 2C. This results in the opening being located in a lower right quadrant of the arm in this example. The rotated arm of FIG. 2C can then be rotated 180 degrees again in the plane of the arm to provide still another position for the opening 13. This is shown in FIG. 2D, which shows an example with the opening in an upper left quadrant of the arm. Due to the asymmetry of the arm 10, each one of the configurations shown in FIGS. 2A through 2D provides the opening 13 apparently at a different location when viewed straight on to one of the faces of the arm.

The arm 10 further comprises a plurality of attachment elements 14. In this example, two attachment elements 14 are provided on the arm 10, with each of the attachment elements 14 positioned at an opposing end of the arm 10. Whilst the example shows the attachment elements 14 near the lateral sides of the arm 10, in other examples the attachment elements 14 can be positioned near the longitudinal sides of the arm 10.

Each attachment element 14 is arranged, in use, to attach the arm 10 to the base plate 20. In this example, each attachment element 14 comprises two bores 15. The bores 15 are arranged to receive and engage a securing element 19 for securing the arm 10 directly or indirectly to the base plate 20. Examples of securing elements 19 include screws, rails, pins, or any combination of these. The bores 15 in the example shown are through-bores, and comprise a threaded surface. The threaded surface of each bore 15 is arranged, in use, to cooperate and engage with a complementary threaded surface on a securing element 19. Of course, depending on the choice of the securing element 19, other examples of the arm 10 may comprise blind bores or non-threaded bores. As well as having the threaded surface, the bores have a counter-sunk portion. As is set out in more detail below, this is configured to cooperate with a securing element. Each of the attachment elements 14 are symmetrically positioned on the arm 10.

The pair of bores 15 within each attachment element 14 are joined by a slot 17. Each slot 17 extends between the two bores 15 in each attachment element 14 to provide a continuous through-bore linking the two bores 15. The slots 17 can be used to provide additional functionalities, such as a hooking point for a strap or other accessories.

It will be noted that, as in the example shown, through-bores can act as attachment elements 14 on both faces of the arm 10. The bores 15 may be threaded from both a front and a rear face, to provide attachment elements 14 at corresponding positions on both faces. A securing element 19 may engage each of the through-bores 15 from either face of the arm 10.

The arm 10 further comprises an engagement means 16, arranged in use to cooperate and engage with a corresponding member of a support. By "support" we intend to mean tripod, monopod, ball head joint or any other means for attaching a bracket or mounting plate to a tripod or monopod. The engagement means 16 comprises a pair of grooves on the opposing longitudinal sides. In this example, the grooves are dovetail grooves. By dovetail, we intend to mean that at least a portion of the cross-section has a triangular shape. The grooves can be used to co-operate with a rail or jaw having a complementary shape, to form a 'dovetail joint'. In particular, the arm can be secured on a support by clamping the groove in a jaw member on the support. The support may comprise a 'Quick-Release (QR)' mechanism to facilitate rapid attachment and detachment of the engagement means to the support. The grooves in this example are intended to be compatible with an Arca-Swiss quick release system.

An important feature of the arm 10 is that the grooves of the engagement means 19 are symmetric about the longitudinal centre of the groove. In other words, the 'double-sided dovetail' grooves can cooperate with a jaw of a corresponding member on a support when the arm 10 has been rotated about its longitudinal axis. This allows the arm 10 to be attached to the base plate 20 in any one of the configurations shown in FIGS. 2A to 2D with either face being closer to the support than the other face.

Turning now to the base plate 20, an upper surface and a lower surface are provided on the base plate 20. In the example shown, the base plate 20 is arranged to receive a device on the upper surface.

The base plate 20 comprises a connector 21 for removeably connecting, in use, a device to the base plate 20. The connector 21 comprises a connector bore 22 and a securing element 23. The securing element 23 comprises a threaded bolt and is arranged to co-operate, through the connector bore 22, with a threaded surface on a device, to secure the base plate 20 and the device together. For reference, there are two standard thread sizes that are used for photographic equipment: a ⅜ inch (9.525 mm) thread, and a ¼ inch (6.350 mm) thread. The threaded bolt shown in FIG. 1 comprises a ¼ inch (6.350 mm) thread, to ensure universal connection with photographic equipment. In this example, the connector bores 22 are threaded at the same diameter as the bores 15 of the arm 10. This allows, for example, a device to be mounted at either one of the connector 21 of the base plate 20 or the attachment means 14 of the arm 10.

As shown in the figures, the base plate 20 may be provided with a plurality of connector bores 22. This provides the user with greater flexibility as to the position at which a device may be mounted to the base plate 20. For example, the connector bore 22 to be used may be chosen depending on the dimensions of the device being secured to the base plate 20.

As described above, the upper surface of base plate 20 is arranged to receive and secure a device to the base plate 20. In order to ensure a safe and durable interface between the device and the base plate 20, the upper surface of the base plate 20 is provided with gripping pads 28. In the example shown, a plurality of gripping pads 28 are provided and are distributed across a significant area of the upper surface. In other examples, a single pad 28 may be provided on the upper surface. The gripping pads reduce the likelihood of device slip, and also act as a cushion to provide a soft interface between the device and the base plate 20.

The base plate 20 further comprises an engagement means 26, arranged in use to co-operate and engage with a corresponding member of a support. As with the engagement means 16 on the arm, the engagement means 26 of the base plate 20 comprises a pair of dovetail grooves on opposing longitudinal sides. In this case, by dovetail, we intend to mean that at least a portion of the cross-section has a trapezoidal shape.

The grooves can be used to co-operate with a rail or jaw having a complementary shape, to form a 'dovetail joint'. In particular, the base plate 20 can be secured on a support by clamping the groove in a jaw member on the support. The support may comprise a QR mechanism to facilitate rapid attachment and detachment of the engagement means to the support. Again, this is intended to be compatible with an Arca-Swiss type quick release system.

Figure 3:
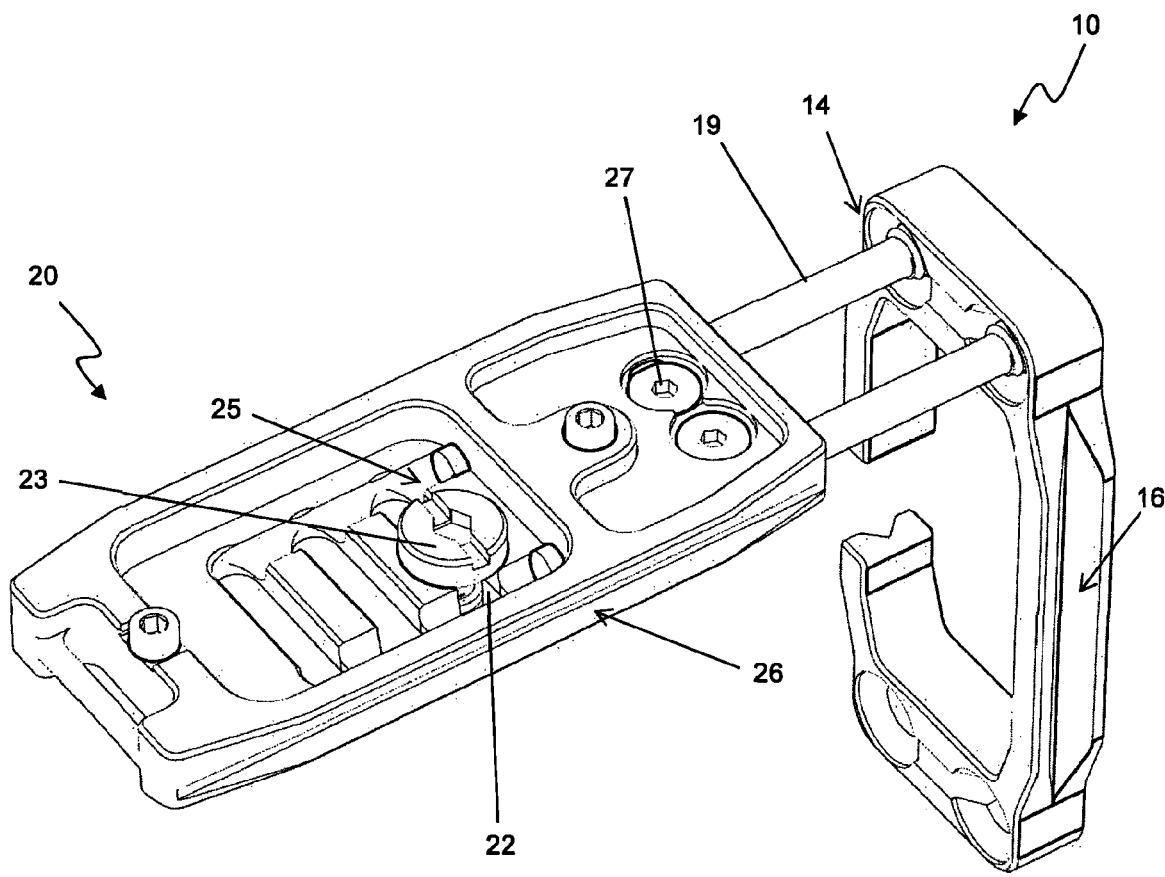
FIG. 3 schematically illustrates a detail view of a portion of the example mounting assembly of FIG. 1.

The mounting assembly of FIG. 1 shows the arm 10 and the base plate 20 being connected via a securing element 19. A detailed view of the connection is shown in FIG. 3.

In the example shown, which is viewed from below the assembly in FIG. 3, the base plate 20 comprises two bores 24 each arranged to engage with a securing element 19 to secure the base plate 20 to the attachment means 14 of the arm 10. The base plate 20 further comprises recesses 25 adjacent to the bores 24. The recesses are arranged to receive and guide the securing element 19, and to allow a smooth slideable engagement between the base plate 20 and the securing element 19.

In the assembled configuration, the arm 10 is secured to the base plate 20 by a securing element 19. The securing element 19 engages an attachment means 14 of an arm at one end and a bore 24 of the base plate 20 at the other end. A user can select a desired configuration of the arm 10 (from the configurations shown in FIGS. 2A to 2D), and connect the securing element 19 to the attachment means 14 of the arm 10. The securing element 19 can then be inserted in the bores 24 of the base plate 20 to complete the connection between arm 10 and base plate 20.

In this example the securing element 19 is provided by a rail, a pair of which are used to connect the arm and base plate as set out above. The rails have a cylindrical pole section engageable with the bores 24 of the base plate 20 and a treaded end portion engageable with the arm. The end portion of each rail also has a tapered portion that has a complimentary shape to the counter-sunk portion of the attachment elements 14 of the arm 10. This allows the end of the rail to be flush with a face of the arm when the arm is mounted to the base plate.

The base plate 20 shown in FIG. 3 further comprises two locking members 27. Each of the locking members 27 are arranged to lock the position of a securing element 19 in the bore 24 and recess 25 of the base plate 20. The locking members 27 comprise locking screws whose axis of insertion into the base plate 20 intersects the axis of motion of the securing element 19 in the bore 24. The locking screws can be tightened to exert a force on the securing element 19 so as to engage and hold the securing element 19 in position. In this way, once a desired orientation of the arm 10 and base plate 20 has been achieved, a user can lock the parts together and ensure that the mounting assembly 1 holds its configuration.

As can be seen in FIG. 3, the lower surface of the base plate 20 can comprise raised portions or areas of raised surface. The raised surface can be arranged to interact with a complementary portion of an external component.

Once assembled, the mounting assembly 1 can be used to mount a device to a support, by connecting a device to the connector 21 (or one of the attachment means 14) and then engaging the mounting assembly 1 to a support via one of the engagement means 16 or 26.

Due to the aperture 12 in the arm, the mounting assembly 1 provides a user with significant access to the device even when the device is in use on the assembly 1. Advantageously, the arm 10 can be configured, using one of the orientations shown in FIGS. 2A to 2D, to position the opening 13 to provide still further access to the device when in use. The ability to move the position of the opening 13 provides significant versatility to the mounting assembly 1, which can be adjusted and configured for use with a large number of devices. A particular advantage of the opening 13 is that it allows the user to connect to the side of the device cables having right-angled connectors.

Figure 4A:
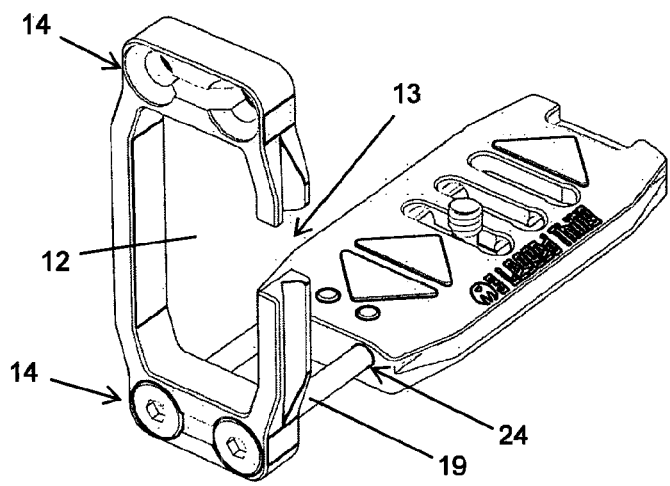
FIG. 4A schematically illustrates an example configuration of the mounting assembly of FIG. 1.
Figure 4B:
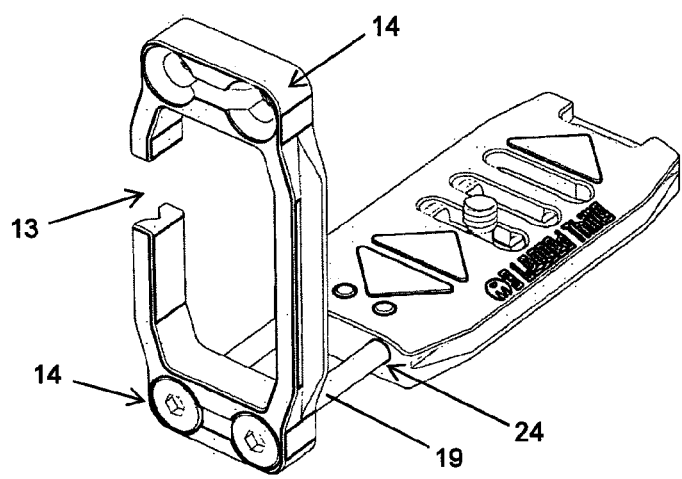
FIG. 4B schematically illustrates another example configuration of the mounting assembly of FIG. 1.
Figure 4C:
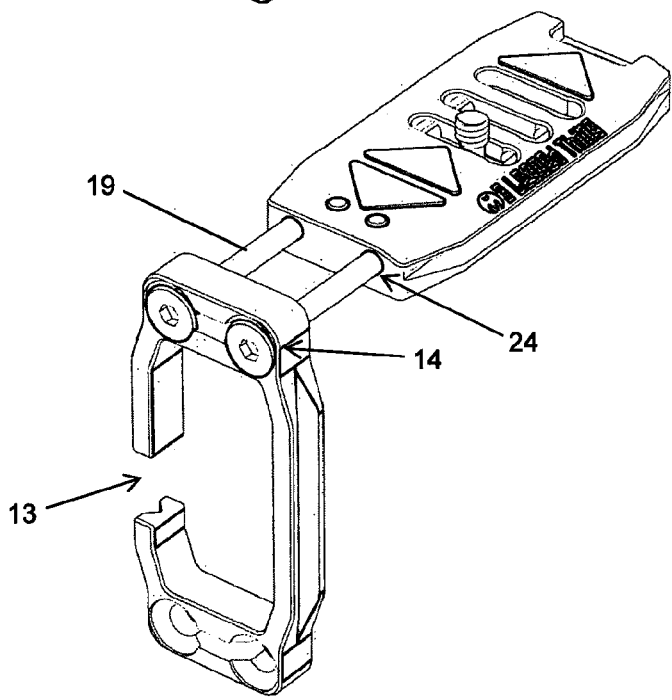
FIG. 4C schematically illustrates another example configuration of the mounting assembly of FIG. 1.

Some example configurations of the mounting assembly 1 have been illustrated in FIGS. 4A to 4C. FIGS. 4A and 4B illustrate example configurations of the mounting assembly 1 in which the orientation of the arm 10 has been rotated by 180 degrees about its longitudinal axis. A user may effect a transition between the two configurations of FIGS. 4A and 4B by disengaging the securing element 19 from the base plate 20 and the arm 10, rotating the arm 180 degrees through its longitudinal axis and reengaging the securing means to both the base plate 20 and the arm 10.

It can be seen that, by attaching the arm 10 to the base plate 20 at the different attachment elements, the apparent position of the opening 13 with respect to the base plate 20 can be reconfigured. In other words, the distance from the opening 13 to the base plate 20 is different when the arm 10 is connected to the base plate 20 by each respective attachment element 14.

FIG. 4C shows an alternative arrangement with the arm 10 extending downwardly from the base plate instead or upwardly as in FIGS. 4A and 4B. This is achieved by the manner in which the securing element 19 and arm are arranged relative to the base plate. This allows the arm to be used as a handle or as an alternative support means when the device mountable to the base plate is wanted in a different position.

In order to facilitate the use of device accessories such as a camera flip screen, the upper surface of the base plate 20 has a chamfered edge along a longitudinal side (i.e. the side on which the engagement elements are located). This provides an angled surface to allow a user to insert their figures between the base plate and the device to a sufficient extend to release the flip screen.

Figure 5:
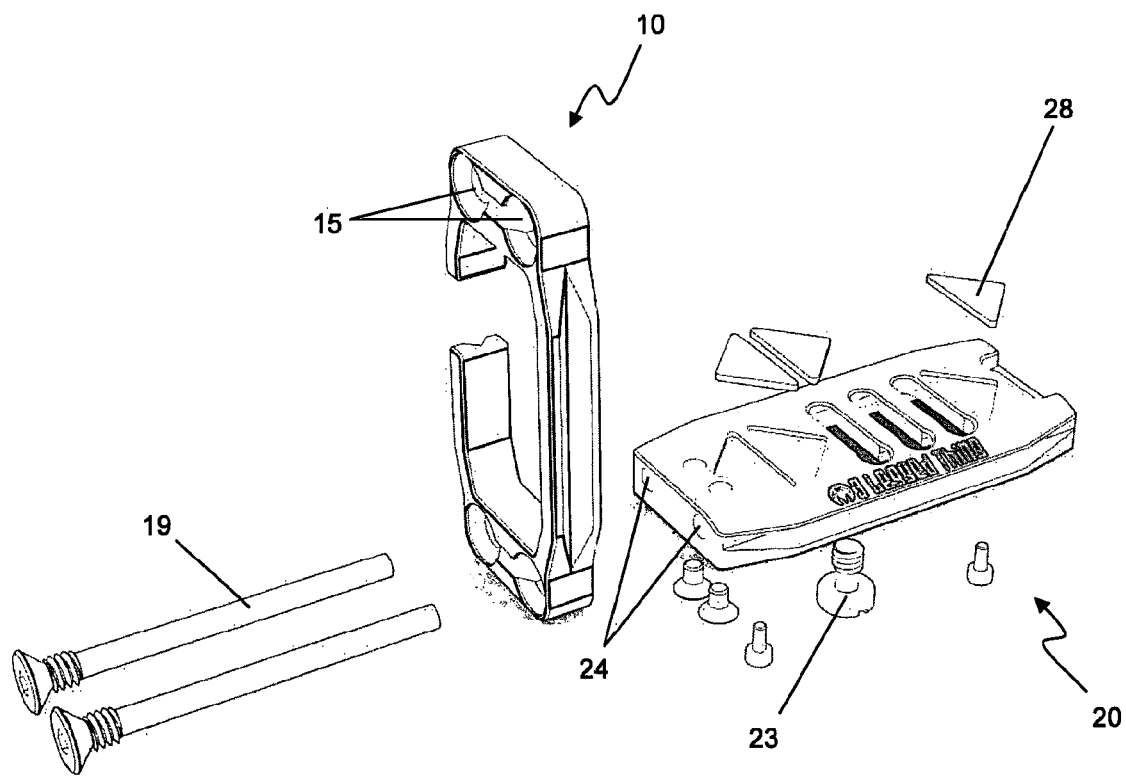
FIG. 5 schematically illustrates the example mounting assembly of FIG. 1 in an unassembled configuration.

The mounting assembly 1 can be seen in FIG. 5 in an unassembled configuration. It can be seen from FIG. 5 that the mounting assembly 1 can easily be assembled from a kit consisting mainly of the arm 10 and the base plate 20. It can also be seen that the orientation of the arm 10, and thus the positon of the opening 13, can easily be configured by removing the securing element 19, adjusting the arm 10 with respect to the base plate 20, and reengaging the securing element 19.

The invention claimed is:

1. A mounting assembly for mounting a device to a support, the assembly comprising:
   a base plate comprising a connector to removably connect, in use, the base plate to the device, and an engagement means for engagement with the support; and
   an arm being a plate having an aperture therethrough thereby forming a ring, the ring having an opening in a side providing a break in the ring, the break giving the ring a C-shape, the arm having a plurality of attachment elements arranged, in use, to attach the arm to the base plate, wherein
   the position of the opening in the side of the ring causing the orientation of the C-shape to change relative to the base plate when the arm is connected to the base plate by each respective attachment element.

2. The mounting assembly according to claim 1, wherein the arm has opposing ends, the opening being between the opposing ends, and each end having at least one attachment element of the plurality of attachment elements.

3. The mounting assembly according to claim 1, wherein the arm has a front face and a rear face, each face having at least one attachment element of the plurality of attachment elements.

4. The mounting assembly according to claim 3, wherein the attachment elements on each of the front and rear faces of the arm are positioned at corresponding positions of the front and rear faces.

5. The mounting assembly according to claim 1, wherein each attachment element comprises one or more bores, and each of the bores is arranged, in use, to engage a first securing element engageable with the base plate.

6. The mounting assembly according to claim 5, wherein the first securing element comprises a rail.

7. The mounting assembly according to claim 6, wherein at least a portion of the rail has a threaded surface.

8. The mounting assembly according to claim 5, wherein the bores are threaded bores.

9. The mounting assembly according to claim 5, wherein the bores are through-bores.

10. The mounting assembly according to claim 9, wherein the through-bores of each attachment element are joined by one or more slots extending between the through-bores, and optionally the slots are through-slots, extending between the front and rear faces of the arm.

11. The mounting assembly according to claim 1, wherein the connector comprises a connector bore, and the connector bore is arranged, in use, to engage a second securing element.

12. The mounting assembly according to claim 11, wherein each attachment element of the plurality of attachment elements is engageable, in use, with the second securing element.

13. The mounting assembly according to claim 1, wherein the base plate comprises one or more bores, each bore of the one or more bores being arranged, in use, to engage with a first securing element to secure the base plate to the attachment elements of the arm.

14. The mounting assembly according to claim 13, wherein the first securing element is slideable relative to the base plate.

15. The mounting assembly according to claim 13, wherein the base plate further comprises a locking member arranged in use to lock one or more first securing elements in position.

16. The mounting assembly according to claim 15, wherein the locking member comprises one or more locking screws each arranged to engage one or more first securing elements.

17. The mounting assembly according to claim 1, wherein the arm comprises an engagement means for engagement with the support.

18. The mounting assembly according to claim 1, wherein the engagement means on each of the arm and the base plate comprise a pair of grooves on opposing sides of the arm and the base plate respectively, and optionally the grooves of the engagement means are dovetail grooves.

19. The mounting assembly according to claim 1, wherein the base plate comprises an upper surface and a lower surface, the upper surface arranged to receive, in use, the device, and at least one edge of the upper surface comprises a downward chamfer.

20. A kit of parts for a mounting assembly, the kit comprising:
- a base plate comprising a connector to removably connect, in use, the base plate to a device, and an engagement means for engagement with a support; and
- an arm being a plate having an aperture therethrough thereby forming a ring, the ring having an opening in a side providing a break in the ring, the break giving the ring a C-shape, the arm having a plurality of attachment elements arranged, in use, to attach the arm to the base plate, wherein the position of the opening in the side of the ring causing the orientation of the C-shape to change relative to the base plate when the arm is connected to the base plate by each respective attachment element.

* * * * *